United States Patent
Yoo

(10) Patent No.: US 9,379,658 B2
(45) Date of Patent: Jun. 28, 2016

(54) APPARATUS FOR CONTROLLING INDUCTION MOTOR

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/533,952

(22) Filed: Nov. 5, 2014

(65) Prior Publication Data
US 2015/0155815 A1    Jun. 4, 2015

(30) Foreign Application Priority Data
Nov. 29, 2013  (KR) ........................ 10-2013-0147351

(51) Int. Cl.
H02P 23/00 (2006.01)
H02P 27/02 (2016.01)
H02K 17/12 (2006.01)
H02P 27/04 (2016.01)

(52) U.S. Cl.
CPC .............. *H02P 27/023* (2013.01); *H02K 17/12* (2013.01); *H02P 23/00* (2013.01); *H02P 27/047* (2013.01)

(58) Field of Classification Search
CPC ..... H02P 21/0003; H02P 1/28; H02P 27/047; G01P 3/48
See application file for complete search history.

(56) References Cited

U.S. PATENT DOCUMENTS

| 5,646,499 A | 7/1997 | Doyama et al. |
| 2010/0315033 A1 | 12/2010 | Lu et al. |
| 2011/0156632 A1 | 6/2011 | Cheng et al. |
| 2012/0280645 A1 | 11/2012 | Olsson et al. |
| 2013/0221885 A1* | 8/2013 | Hunter ................ H02P 21/0003 318/400.15 |

FOREIGN PATENT DOCUMENTS

| JP | 11-206141 | 7/1999 |
| JP | 2002-142466 | 5/2002 |
| JP | 2008-295125 | 12/2008 |
| JP | 2012-120429 | 6/2012 |
| KR | 10-2001-0111099 | 12/2001 |

OTHER PUBLICATIONS

Korean Intellectual Property Office Application Serial No. 10-2013-0147351, Office Action dated Dec. 24, 2014, 4 pages.
European Patent Office Application Serial No. 14193451.3, Search Report dated Sep. 8, 2015, 5 pages.
Japan Patent Office Application Serial No. 2014-234293, Office Action dated Jan. 5, 2016, 5 pages.

* cited by examiner

*Primary Examiner* — Karen Masih
(74) *Attorney, Agent, or Firm* — Lee, Hong, Degerman, Kang & Waimey PC; Jonathan Kang; Justin Lee

(57) ABSTRACT

An apparatus for controlling an induction machine is disclosed, wherein a magnitude of a current outputted to the induction machine to an inverter is determined by the apparatus to determine a voltage amount that compensates the command voltage in response to the magnitude of the current, and a voltage compensation amount is added to a command voltage determined from a voltage-frequency relationship according to a relevant voltage compensation amount to output a final command voltage.

10 Claims, 4 Drawing Sheets

US 9,379,658 B2

APPARATUS FOR CONTROLLING INDUCTION MOTOR

CROSS-REFERENCE TO RELATED APPLICATIONS

Pursuant to 35 U.S.C. §119(a), this application claims the benefit of earlier filing date and right of priority to Korean Patent Application No.10-2013-0147351, filed on Nov. 29, 2013, the contents of which are all hereby incorporated by reference herein in its entirety.

BACKGROUND OF THE DISCLOSURE

1. Field

The teachings in accordance with the exemplary embodiments of this present disclosure generally relate to an apparatus for controlling an induction machine.

2. Background

In general, an induction machine is a motor used in various areas ranging from a field including a fan and a pump to a hoisting field including a crane and an elevator. Meantime, an inverter, which is a device configured to enable a VVVF (Variable Voltage Variable Frequency) operation, can control a torque and speed of a motor using a constant flux operation: V/f) or a vector control.

FIG. 1 is a block diagram illustrating an inverter system according to prior art, where an inverter (2) configured to receive a power from a 3-phase power source (1) drives an induction motor (3) by converting the received power source to a predetermined voltage and frequency. The inverter (2) may be a 2-level inverter or a 3 or more level multilevel inverter, for example.

FIG. 2 is a schematic view illustrating a configuration of an inverter driving system according to prior art, where a constant flux operation method is shown when there is no rotor position sensor for the induction motor (3).

Referring to FIG. 2, a command voltage generation unit (210) serves to determine an inverter output voltage on a synchronous coordinate system using a command frequency, and a conversion unit (220) functions to provide an output of the command voltage generation unit (210) to the inverter (2) by converting the output of the command voltage generation unit (210).

The inverter (2) may apply a 3-phase voltage to the induction motor (3) by receiving a command voltage on a stationary coordinate system, and a conversion unit (240) receives a phase current between the inverter (2) and the induction motor (3) from current detection units (230a, 230b, 230c) and converts the received phase current to d axis and q axis currents on the synchronous coordinate system. An output of the conversion unit (240) may be used as an input for other control of the inverter system.

The command voltage generation unit (210) determines a magnitude of an output voltage in response to a given command frequency. At this time, a pattern of output voltage based on the frequency may be predetermined by a controller (not shown) or defined by a user.

FIG. 3 is an example of output voltage based on frequency for a constant flux operation according to prior art.

That is, the command voltage generation unit (210) may output a command voltage by determining the command voltage from a relationship between a predetermined voltage and frequency as in FIG. 3 in response to the given command frequency. The constant flux operation is to output a voltage corresponding to a frequency required by the predetermined voltage-frequency ratio. However, there is generated a problem where operation of a motor fails when load change is great due to the frequency-voltage relationship or at a field that requires a high torque at a low speed.

SUMMARY OF THE DISCLOSURE

The present disclosure is to provide an apparatus for controlling an induction machine (hereinafter also referred to as "induction motor controlling apparatus" or simply as "apparatus") configured to stably operate an induction motor by varying a magnitude of a voltage in response to a load circumstance during a constant flux operation of the induction motor and by preventing a motor stoppage or a motor start failure even when a starting torque is greatly required or a load change is great.

In one general aspect of the present disclosure, there is provided an apparatus for controlling an induction machine in a system including a first determination unit configured to determine a command voltage in response to a command frequency from a predetermined voltage-frequency relationship, and an inverter configured to drive an induction motor in response to the command voltage, the apparatus comprising:

a second determination unit configured to determine the magnitude of a current outputted from the inverter to the induction motor; and a third determination unit configured to determine a voltage compensation amount for compensating (offsetting) the command voltage in response to the magnitude of a current outputted from the inverter to the induction motor, wherein the first determination unit outputs a final command voltage in which the command voltage determined by the voltage-frequency relationship in response to the voltage compensation (offset) amount received from the third determination unit is added by the voltage compensation amount.

Preferably, but not necessarily, the apparatus may further comprise a first conversion unit configured to provide an output voltage of the first determination unit to the inverter by converting the output voltage of the first determination unit to a voltage on a stationary coordinate system.

Preferably, but not necessarily, the apparatus may further comprise a current detection unit configured to detect a magnitude of a current outputted from the inverter to the induction motor.

Preferably, but not necessarily, the apparatus may further comprise a second conversion unit configured to convert an output of the current detection unit to d axis and q axis currents on a synchronous coordinate system.

Preferably, but not necessarily, the second determination unit may provide a magnitude of a current outputted from the inverter to the induction motor and a magnitude of a q axis current to the third determination unit.

Preferably, but not necessarily, the third determination unit may include, an error generation unit configured to determine a difference between a magnitude of the q axis current and a value in which a rated current of the inverter or the induction motor is multiplied by a first gain, a comparison unit configured to output '1' when an output of the error generation unit is greater than zero (0) and to output zero (0) when the output of the error generation unit is smaller than zero (0), a division unit configured to output a value in which a magnitude of a current outputted from the inverter to the induction motor is divided by a rated current of the inverter or the induction motor multiplied by a second gain, a first multiplication unit configured to multiply the output of the division unit by the output of the comparison unit, an amplification unit configured to output a value by multiplying the output of the first multiplication unit by a third gain, an addition unit configured to add the output of the amplification unit to a preset offset voltage, and a second multiplication unit configured to determine a code of a final output in response to a code of a command frequency of the first determination unit.

Preferably, but not necessarily, the third determination unit may further include a low-pass filter unit arranged between the first multiplication unit and the amplification unit to low-pass-filter an output of the first multiplication unit.

Preferably, but not necessarily, the third determination unit may further include a first limitation unit arranged between the amplification unit and the addition unit to limit an output of the amplification unit using a predetermined minimum value and maximum value.

Preferably, but not necessarily, the third determination unit may further include a second limitation unit arranged between the addition unit and the second multiplication unit to limit an output of the addition unit using a predetermined minimum value and maximum value.

Preferably, but not necessarily, the second multiplication unit may multiply a code of the command frequency by an output of the addition unit.

ADVANTAGEOUS EFFECTS OF THE DISCLOSURE

The present disclosure has an advantageous effect in that performance of a starting torque can be improved by varying an inverter output voltage in response to a load circumstance.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present disclosure will be described in detail with reference to the accompanying drawings.

Figure 4:
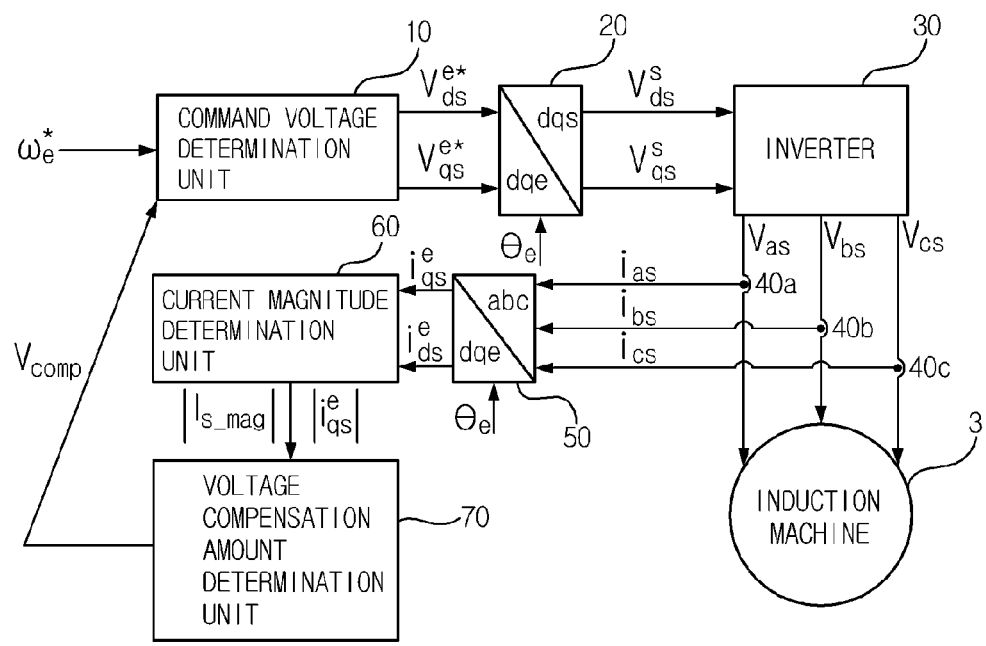
FIG. 4 is a block diagram illustrating an apparatus for controlling induction machine according to an exemplary embodiment of the present disclosure.

FIG. 4 is a block diagram illustrating an apparatus for controlling induction machine according to an exemplary embodiment of the present disclosure.

The apparatus for controlling an induction machine (also referred to as "induction motor controlling apparatus" or simply as "apparatus") according to the present disclosure illustrates a control method free from a rotor position sensor, and it should be apparent to the skilled in the art that control can be implemented included with rotor position information when a rotor position sensor is included.

Referring to FIG. 4, the apparatus according to the present disclosure is provided to control an induction machine (motor) and may include a command voltage determination unit (10), a first conversion unit (20), an inverter (30), a current detection unit (40), a second conversion unit (50), a current magnitude determination unit (60) and a voltage compensation (offset) determination unit (70).

The command voltage determination unit (10) determines a command voltage of inverter on a synchronous coordinate system from a command frequency. At this time, the command voltage determination unit (10) according to the present disclosure may determine a command voltage in response to a predetermined voltage-frequency relationship as in FIG. 3, and may determine a command voltage in response to an operation of the voltage compensation (offset) determination unit (70) under a predetermined case (e.g., when a large start torque is required or a load change is great), the detailed explanation of which will be provided hereunder.

The first conversion unit (20) may convert an output of the command voltage determination unit (10) to an output voltage of stationary coordinate system. The inverter (30), which is a voltage-type inverter, may apply a 3-phase voltage to the induction motor (3) in response to the command voltage on the stationary coordinate system.

A current detection unit (40a, 40b, 40c) may detect a phase current between the induction motor (3) and the inverter (30), and any one of three current detection units (40a, 40b, 40c) may be omitted.

The second conversion unit (50) may convert the 3-phase current measured by current detection unit (40a, 40b, 40c) to d axis and q axis currents of synchronous coordinate system. An output of the second conversion unit (50) may be used as an input for other control of the inverter system.

The current magnitude determination unit (60) may determine a magnitude of motor phase current and a magnitude of q axis current from the second conversion unit (50). However, although FIG. 4 has illustrated the determination of magnitude of phase current of the motor (3) by receiving an output of the second conversion unit (50), the magnitude may be determined by directly receiving the output of the current detection unit (40a, 40b, 40c).

The voltage compensation amount determination unit (70) may determine a voltage compensation amount for correcting the magnitude of command voltage from the current magnitude determined by the current magnitude determination unit (60).

Hereinafter, operations of the current magnitude determination unit (60) and the voltage compensation amount determination unit (70) will be preponderantly described in more details.

When the output of the second conversion unit (50) is used, the current magnitude determination unit (60) may determine the magnitude of the current by the following Equation 1.

$$|I_{s\_mag}| = \frac{\omega_{c1}}{s+\omega_{c1}}\sqrt{i_{ds}^{e2} + i_{qs}^{e2}} \quad \text{[Equation 1]}$$

where, $\omega_{c1}$ a cut-off frequency of an LPF (Low Pass Filter).

When the output of the current detection unit (40a, 40b, 40c) is used, the current magnitude determination unit (60) may determine the magnitude of the current by the following Equation 2.

$$|I_{s\_mag}| = \frac{\omega_{c1}}{s+\omega_{c1}}\sqrt{\frac{4}{3}(-i_{as}i_{bs} + i_{cs}^2)} \quad \text{[Equation 2]}$$

Figure 5:
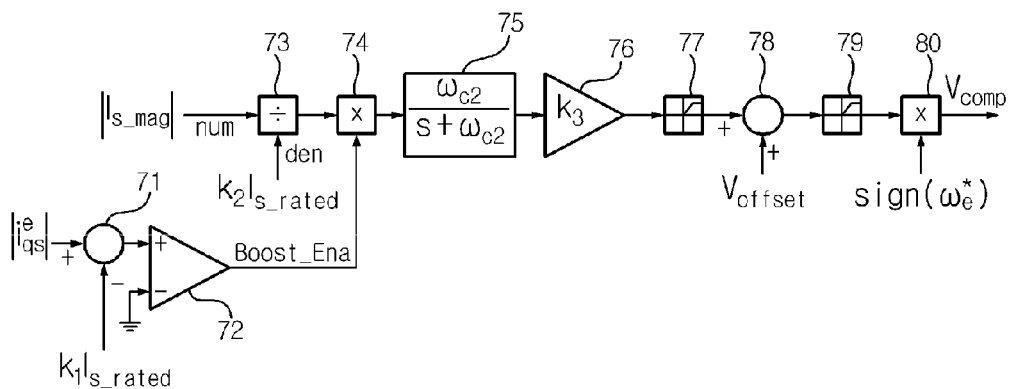
FIG. 5 is a detailed block diagram of a voltage compensation amount determination unit of FIG. 4.

FIG. 5 is a detailed block diagram of a voltage compensation amount determination unit of FIG. 4.

Referring to FIG. 5, the voltage compensation amount determination unit (70) according to an exemplary embodiment of the present disclosure an error generation unit (71), a comparison unit (72), a division unit (73), a first multiplication unit (74), a low-pass unit (75), an amplification unit (76), a first limitation unit (77), an addition unit (78), a second limitation unit (79) and a second multiplication unit (80).

The error generation unit (71) may determine a difference between a magnitude of the q axis current and a value in which a rated current of the inverter (30) or a rated current ($I_{s\_rated}$) of the induction motor (3) is multiplied by a predetermined gain ($K_1$), where a range of gain ($K_1$) may be defined by the following Equation 3.

$$0 < K_1 \leq 1 \quad \text{[Equation 3]}$$

The comparison unit (72) may output '1' when an output of the error generation unit (71) is greater than zero (0) and to output zero (0) when the output of the error generation unit (71) is smaller than zero (0). That is, an output 'Boost_Ena' of the comparison unit (72) is '1' when the output of the error generation unit (71) is greater than zero (0), and '0' when the output of the error generation unit (71) is smaller than zero (0).

The division unit (73) may divide a magnitude of a current which is an output of the current magnitude determination unit (60) by a value in which a magnitude of a current outputted from the inverter (30) or a rated current ($I_{s\_rated}$) of the motor (3) is multiplied by a predetermined gain ($K_2$), where a range of the gain ($K_2$) may be defined by the following Equation 4.

$$0 < K_2 \leq 1 \quad \text{[Equation 4]}$$

The first multiplication unit (74) may multiply the output of the division unit (73) by the output of the comparison unit (72), whereby the output of the division unit (73) is outputted as it is only when the output of the comparison unit (72) is '1'. The low-pass filter unit (75) may low-pass-filter an output of the first multiplication unit (74) to remove harmonics in the output of the first multiplication unit (74). The amplification unit (76) may multiply an output of the low pass filter unit (75) by a predetermined gain ($K_3$), where the gain ($K_3$) is a positive value.

The first limitation unit (77) may limit the output of the amplification unit (76) to a minimum value and a maximum value, where the minimum value may be determined as '0' and the maximum value may be determined as a positive value not exceeding a maximum output of the inverter (30). At this time, the first limitation unit (77) may be selectively used.

The addition unit (78) may add the output of the first limitation unit (77) (output of the amplification unit (76) when the first limitation unit (77) is not used) to a preset offset voltage (Voffset), where the preset offset voltage is a positive value over zero (0). The second limitation unit (79) may limit the output of the addition unit (78).

The amplification unit (80) may determine a code of a voltage compensation amount, which is a final output of the voltage compensation amount determination unit (70), using 'sign' function determining a code of a command frequency of the command voltage determination unit (10) of FIG. 4. That is, the code of the voltage compensation amount, which is a final output, is negative when the code of the command frequency is negative, and the code of the voltage compensation amount, which is a final output, is positive when the code of the command frequency is positive, where the sign function may be defined by the following Equation 5.

$$\text{sign}(x) = \begin{cases} -1 & (x < 0) \\ 1 & (x \geq 0) \end{cases} \quad \text{[Equation 5]}$$

Figure 1:
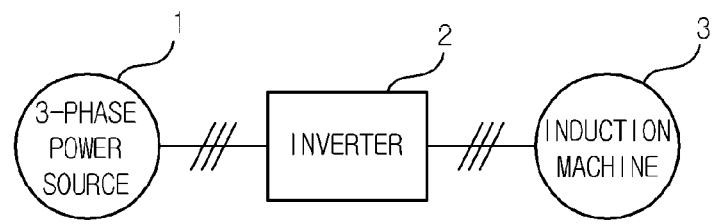
FIG. 1 is a block diagram illustrating an inverter system according to prior art.
Figure 2:
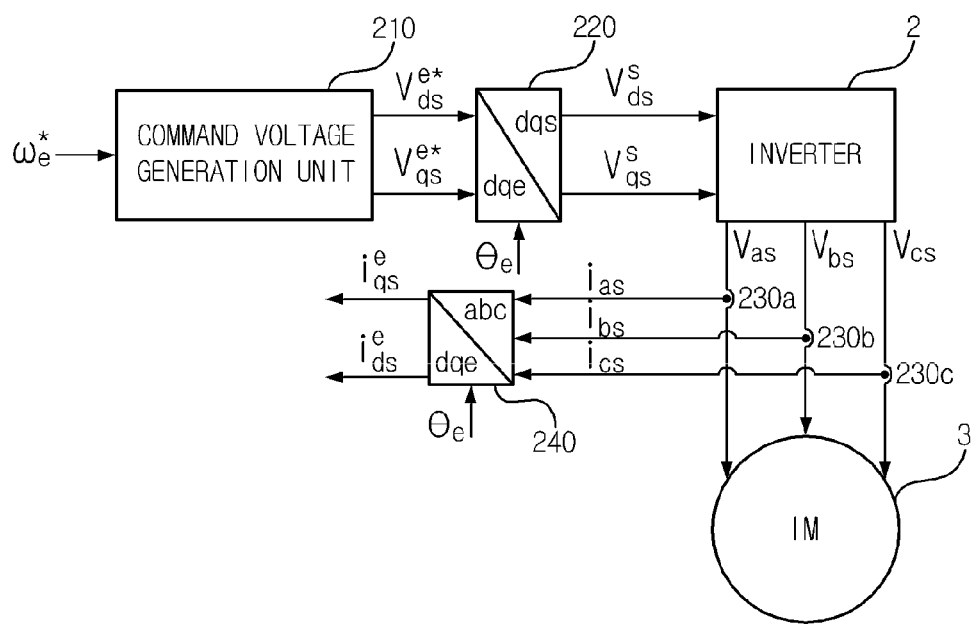
FIG. 2 is a schematic view illustrating a configuration of an inverter driving system according to prior art.
Figure 3:
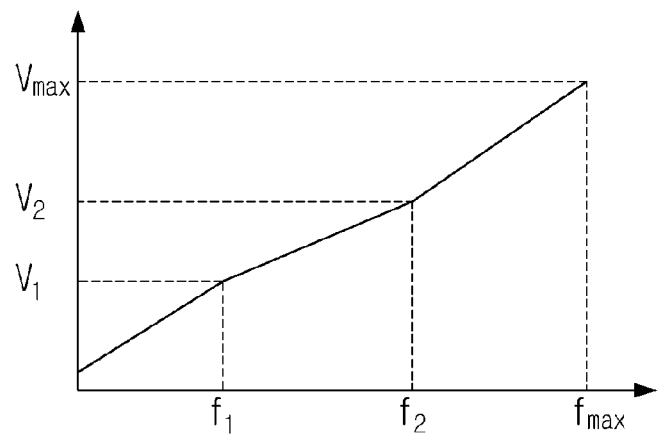
FIG. 3 is an example of output voltage based on frequency for a constant flux operation according to prior art.

As noted from the foregoing, the voltage compensation amount determination unit (70) may determine the voltage compensation amount when the output current of the inverter or the phase current of the motor increases over a predetermined range, whereby the command voltage determination unit (10) may output a final command voltage by adding the command voltage determined by the voltage-frequency relationship of FIG. 3 by the voltage compensation amount.

Figure 6A:
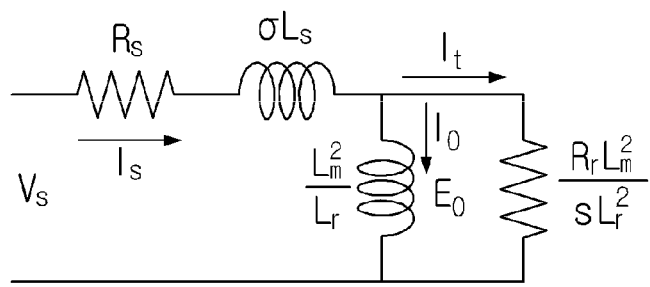
FIGS. 6a and 6b are respectively exemplary views illustrating a principle of the present disclosure.
Figure 6B:
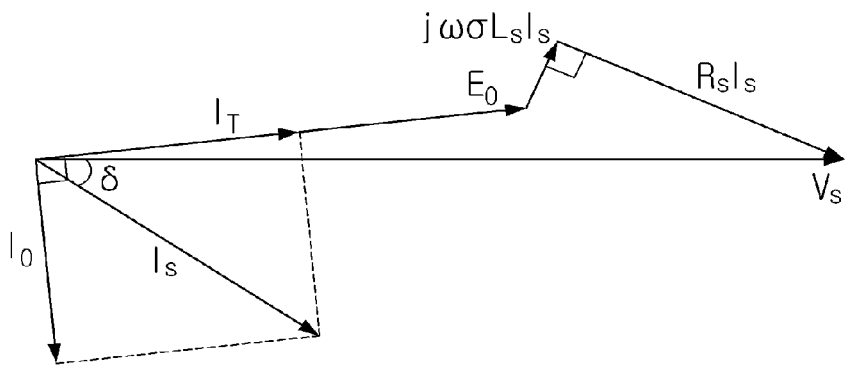

FIGS. 6a and 6b are respectively exemplary views illustrating a principle of the present disclosure, where FIG. 6a is an equivalent circuit of an induction motor and FIG. 6b is a phasor of current and voltage of FIG. 6a.

An excitation voltage (Eo) may be determined by a phase resistance (Rs) and an excessive inductance ($\sigma Ls$) when an output current (Is) relative to an input voltage (Vs) in an equivalent circuit of FIG. 6a has a values as shown in FIG. 6b. When the excitation voltage is determined, it can be noted that an excitation current (Io) and a torque current ($I_T$) can be determined by FIG. 6b.

The voltage compensation amount determination unit (70) according to the present disclosure determines a voltage compensation amount in order to increase the magnitude of the applied voltage when the magnitude of the current (Is) increases, whereby the magnitude of the excitation voltage (Eo) is increased by the command voltage determination unit (10) that increases the magnitude of the command voltage.

Figure 7:
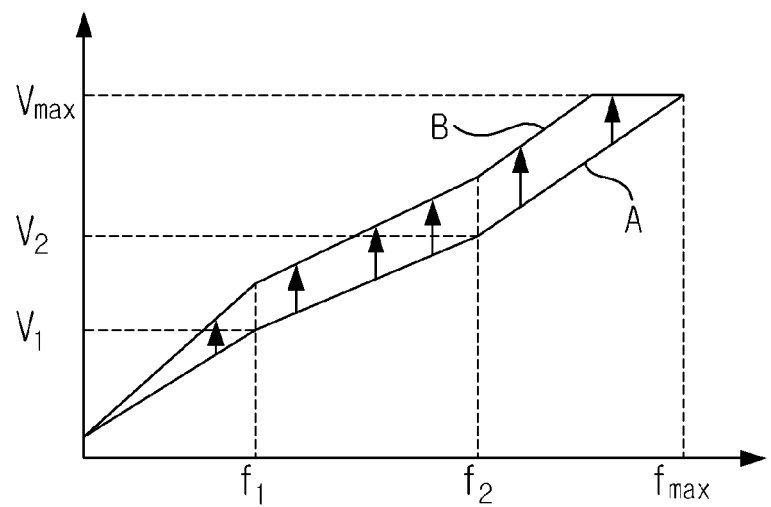
FIG. 7 is an exemplary view illustrating a voltage-frequency relationship corrected according to the present disclosure.

FIG. 7 is an exemplary view illustrating a voltage-frequency relationship corrected according to the present disclosure.

Referring to FIG. 7, the voltage compensation amount determination unit (70) according to the present disclosure determines a voltage compensation amount when a load current increases, whereby the command voltage determination unit (10) can increase the command voltage over a voltage (A) of prior art as much as the voltage compensation amount (b) in a same command frequency.

At this time, the magnitude of the output voltage may maintain a maximum value up to a maximum output frequency when the output voltage reaches a maximum output voltage (Vmax) before reaching a maximum frequency (fmax).

As apparent from the foregoing, the performance of a starting torque can be improved by varying an inverter output voltage in response to a load circumstance.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. An apparatus for controlling an induction machine in a system including a first determination unit configured to determine a command voltage in response to a command frequency from a predetermined voltage-frequency relationship, and an inverter configured to drive an induction motor in response to the command voltage, the apparatus comprising:
   a second determination unit configured to determine the magnitude of a current outputted from the inverter to the induction motor; and
   a third determination unit configured to determine a voltage compensation amount for compensating (offsetting) the command voltage in response to the magnitude of a current outputted from the inverter to the induction motor, wherein the first determination unit outputs a final command voltage in which the command voltage determined by the voltage-frequency relationship in response to the voltage compensation (offset) amount received from the third determination unit is added by the voltage compensation amount.

2. The apparatus of claim 1, further comprising a first conversion unit configured to provide an output voltage of the first determination unit to the inverter by converting the output voltage of the first determination unit to a voltage on a stationary coordinate system.

3. The apparatus of claim 1, further comprising a current detection unit configured to detect a magnitude of a current outputted from the inverter to the induction motor.

4. The apparatus of claim 3, further comprising a second conversion unit configured to convert an output of the current detection unit to d axis and q axis currents on a synchronous coordinate system.

5. The apparatus of claim 4, wherein the second determination unit provides a magnitude of a current outputted from the inverter to the induction motor and a magnitude of a q axis current to the third determination unit.

6. The apparatus of claim 5, wherein the third determination unit includes, an error generation unit configured to determine a difference between a magnitude of the q axis current and a value in which a rated current of the inverter or the induction motor is multiplied by a first gain,
   a comparison unit configured to output '1' when an output of the error generation unit is greater than zero (0) and to output zero (0) when the output of the error generation unit is smaller than zero (0),
   a division unit configured to output a value in which a magnitude of a current outputted from the inverter to the induction motor is divided by a rated current of the inverter or the induction motor multiplied by a second gain,
   a first multiplication unit configured to multiply the output of the division unit by the output of the comparison unit,
   an amplification unit configured to output a value by multiplying the output of the first multiplication unit by a third gain,
   an addition unit configured to add the output of the amplification unit to a preset offset voltage, and
   a second multiplication unit configured to determine a code of a final output in response to a code of a command frequency of the first determination unit.

7. The apparatus of claim 6, wherein the third determination unit further includes a low-pass filter unit arranged between the first multiplication unit and the amplification unit to low-pass-filter an output of the first multiplication unit.

8. The apparatus of claim 6, wherein the third determination unit further includes a first limitation unit arranged between the amplification unit and the addition unit to limit an output of the amplification unit using a predetermined minimum value and maximum value.

9. The apparatus of claim 6, wherein the third determination unit further includes a second limitation unit arranged between the addition unit and the second multiplication unit to limit an output of the addition unit using a predetermined minimum value and maximum value.

10. The apparatus of claim 6, wherein the second multiplication unit multiplies a code of the command frequency by an output of the addition unit.

* * * * *